Feb. 22, 1955 O. D. YELLE 2,702,569
DEFECT REMOVER AND POCKET ROUTER
Filed July 21, 1953 3 Sheets-Sheet 1

INVENTOR.
ORVILLE D. YELLE
BY
Cook & Robinson
ATTORNEYS

Feb. 22, 1955 O. D. YELLE 2,702,569
DEFECT REMOVER AND POCKET ROUTER
Filed July 21, 1953 3 Sheets-Sheet 2
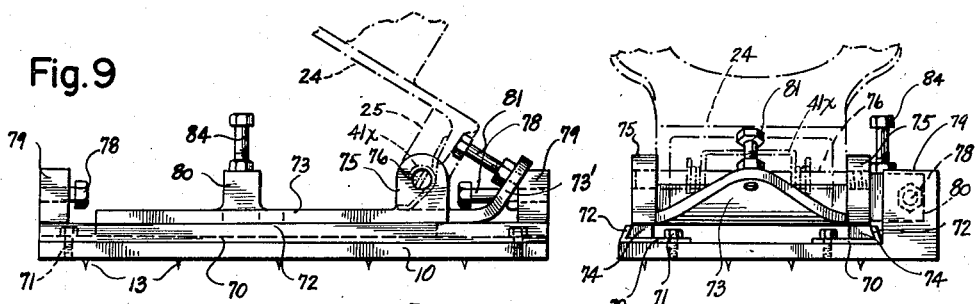
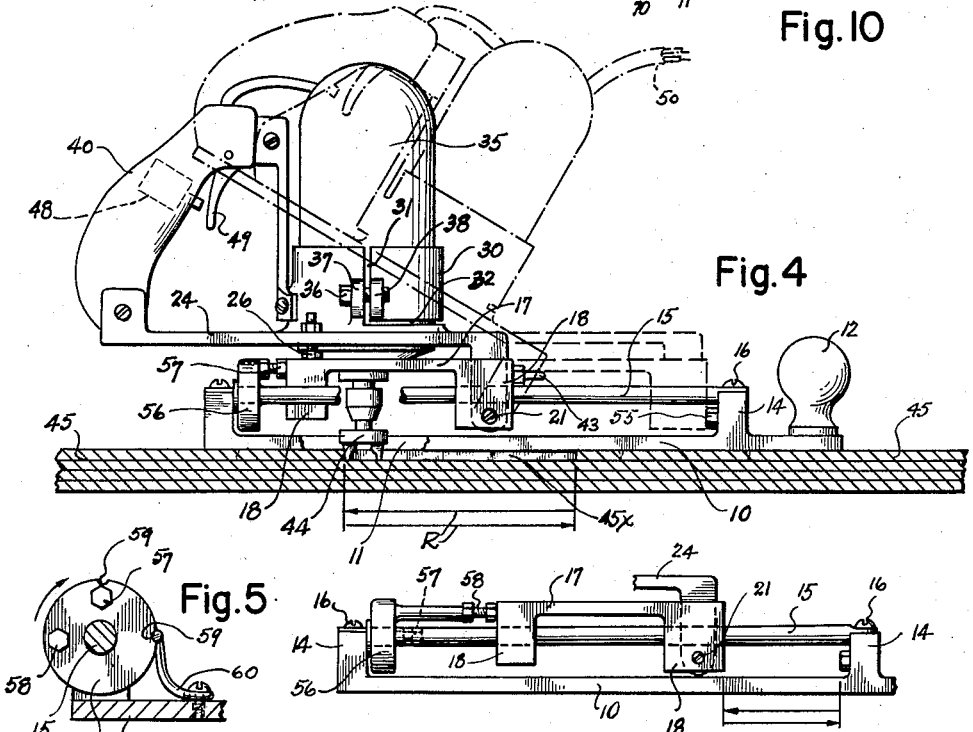
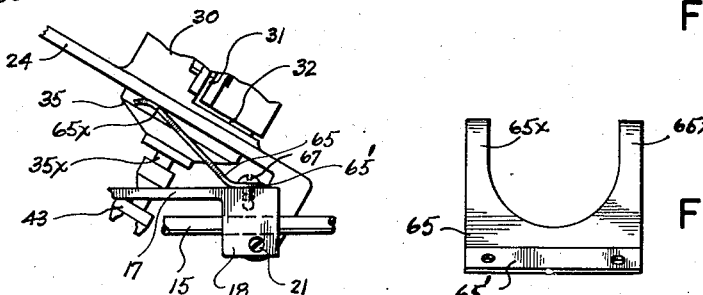
INVENTOR.
ORVILLE D. YELLE
BY
Cook & Robinson
ATTORNEYS Feb. 22, 1955     O. D. YELLE     2,702,569
DEFECT REMOVER AND POCKET ROUTER Filed July 21, 1953     3 Sheets-Sheet 3

INVENTOR.
ORVILLE D. YELLE
BY
*Cook + Robinson*
ATTORNEYS

United States Patent Office 2,702,569
Patented Feb. 22, 1955

2,702,569
DEFECT REMOVER AND POCKET ROUTER

Orville D. Yelle, Everett, Wash.

Application July 21, 1953, Serial No. 369,313

2 Claims. (Cl. 144—136)

This invention relates to improvements in pocket routers, and it has reference more particularly to a specific form of router whereby defects in the surface plys of plywood panels, or the like, can be easily and quickly removed, and whereby in the removal of each of said defects, a pocket of predetermined dimensions will be formed for the reception and gluing therein of a patch piece of like dimensions.

It is the principal object of this invention to provide a light weight, and easily handled portable motor driven pocket router for the above stated purpose and especially useful in the plywood industry, but not limited thereto.

It is a further object of the invention to provide a pocket router for the above stated purpose comprising an open base plate structure, adapted to be placed upon a plywood panel, over a defect that is to be removed, and on which base plate a carriage is mounted for limited reciprocal movement, and a plate, supporting an electric or other type of motor thereon, is hinged to said motor carriage, and the motor drive shaft has a cutter or routing head fixed thereto that is adapted, by the downward swinging of the hinged plate to cut into the defect of the plywood panel, or the like, and then by reciprocal movement of the carriage, to remove the defect and in doing this to form a patch receiving pocket of predetermined dimensions in the panel surface.

It is a further object of this invention to provide means for limiting the travel of the reciprocally mounted carriage to exact distances in order that patch pockets of predetermined and desired lengths may be formed, and to provide spring means for returning and retaining the motor yieldingly in an elevated, non-cutting position until placed on a panel in position of use and manually depressed.

It is also an object of the present invention to provide an easily and readily adjustable means for selectively limiting the reciprocal travel of the motor and router to different distances.

Still further objects and advantages of the present invention reside in the details of construction and combination of parts, as will hereinafter be fully described.

In acomplishing the above mentioned and various other objects of the present invention, I have provided the improved details of construction, the preferred forms of which are illustrated in the acompanying drawings, wherein:

Fig. 4 is a side view of the device of Fig. 1, showing the cutter head as swung downwardly to its pocket routing position, and the carriage as disposed at one of its limits of travel.

Fig. 5 is a cross-sectional detail, taken substantially on line 5—5 in Fig. 1, showing the rotatably adjustable stop carrier wheel.

Fig. 6 is a side view of a part of the main frame structure of the device, and showing the stop carrier wheel as adjusted to utilize the stop for short travel of the carriage.

Fig. 7 is a detail of parts, in side view, showing an alternative form of motor lifting spring.

Fig. 8 is an end view of the motor lifting spring of Fig. 7.

Fig. 9 is a side view of the base plate as equipped with a motor carriage and carriage guides of an alternative form.

Fig. 10 is an end view of the parts shown in Fig. 9.

Figure 1:
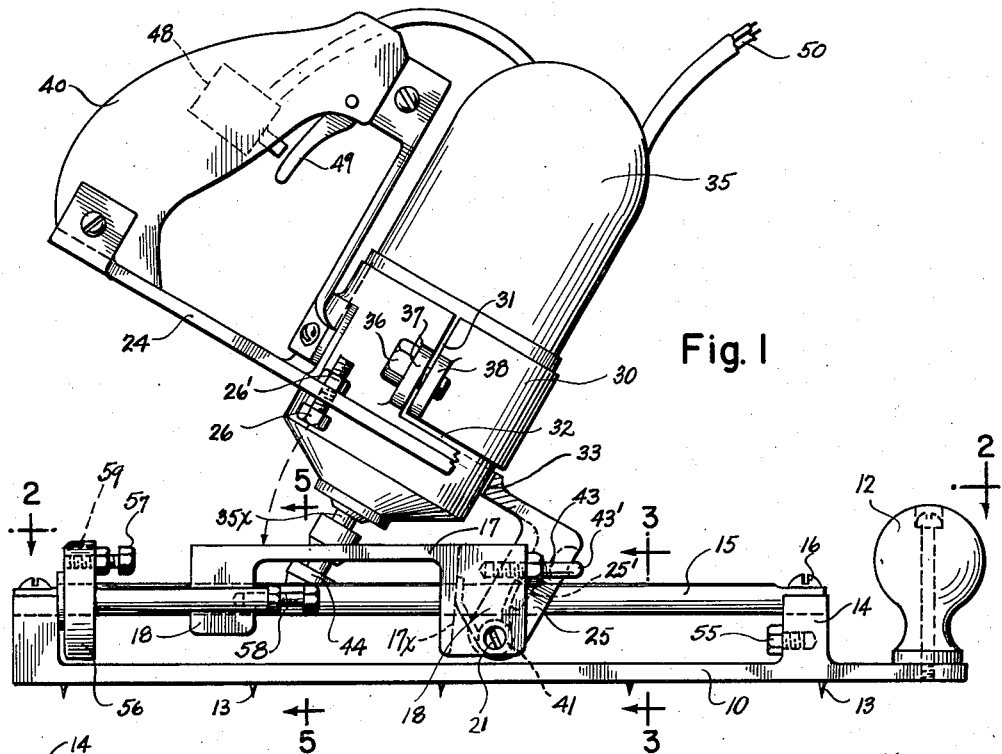
Fig. 1 is a side view of a defect remover and pocket router embodied by the present invention, showing the cutter head and its driving motor in a raised or non-cutting position.
Figure 2:
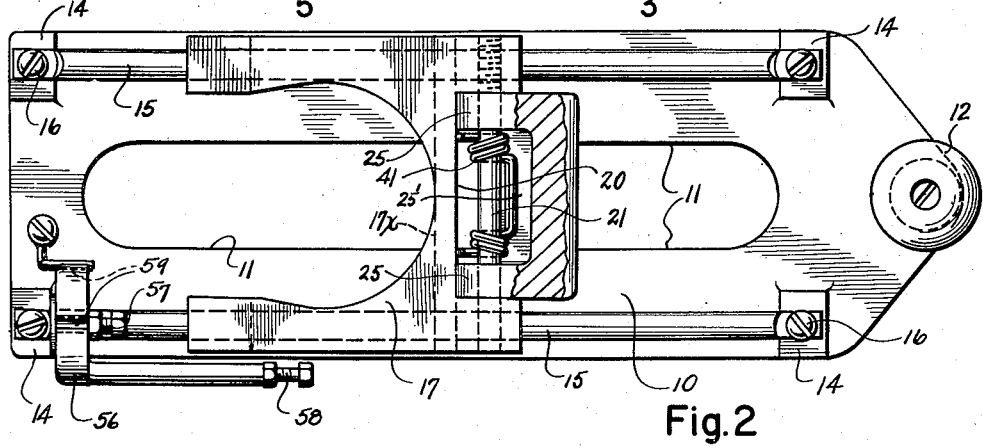
Fig. 2 is a horizontal section of the device, taken on the line 2—2 in Fig. 1, and particularly showing the longitudinal slot in the base plate and shape of the reciprocally mounted carriage.

Referring more in detail to the drawings:

First describing the device of Figs. 1: This comprises a main frame structure including a base plate 10 which, as observed best in Fig. 2, is flat and substantially of rectangular form and is formed in its central longitudinal portion and substantially to its full length with an opening 11. At one end, which will be designated at its outer end, the plate 10 has a hand holding knob 12 fixed thereon, and projecting downwardly from the flat bottom surface of the plate 10, and well distributed thereover are short, sharp pointed teeth 13 designed to pierce the panel on which the device is placed for use to hold it against possible slippage.

Formed on the base plate 10, at its opposite ends, and at opposite sides, are paired upstanding bosses 14, and mounted at their opposite ends, in bosses at the same side of the plate, to extend along the plate and spaced somewhat above it, are parallel rods 15 and 15; these being secured in the bosses by screws 16 tightened thereagainst.

Figure 3:
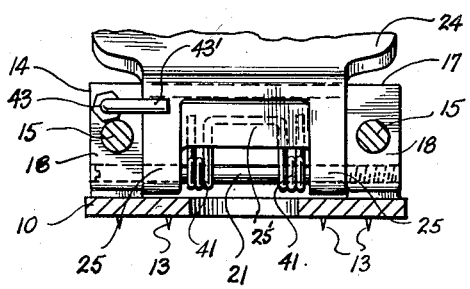
Fig. 3 is a vertical cross-section, taken on line 3—3 in Fig. 1, illustrating the hinged mounting of the motor supporting plate on the carriage.

Slidably mounted on the rods 15—15 for reciprocal travel therealong, is a carriage 17. This comprises a flat, horizontal plate equipped at its opposite ends with downwardly extended bosses 18 with holes bored therethrough which contain the rods 15—15. In plan view, the plate 17 is U-shaped, as best shown in Fig. 2, with the closed end thereof nearest the outer end of the base plate 10. At its base end, that being its closed end, the U-shaped plate 17 is formed with a transverse recess 20, and mounted by and extending between the bosses 18 which are formed on the plate at that end, is a cross-rod 21 upon which one end of a motor mounting plate 24 is hingedly mounted for an up and down swinging movement of the other end of the plate as has been indicated by the dotted line and full line showing of the plate in Fig. 4. The plate 24 extends lengthwise of the base plate 10, overlying the carriage 17 and terminates somewhat beyond it, and it is supported at its hinged end by two downwardly directed legs 25 through which the cross-rod 21 passes, as seen in Fig. 3. The plate 24, when swung downwardly from its upwardly inclined position of Fig. 1 to the horizontal position of Fig. 4, will be stopped at this latter position by the engagement of stop bolt 26 that is carried therein, with the top of the carriage plate 17. The bolt 26 is adjustable and is secured in adjustment by a lock nut 26'. This adjustment provides for an exact determination of the downward swing of the plate 24 and the depth of the pocket to be made by the cutter head, as will presently be better explained.

Formed upon the plate 24, approximately centrally thereof is an upstanding cylindrical collar 30, which is vertically slotted at one side, as shown at 31 in Figs. 1 and 4, and which also has that portion which is seen at one side of the slot 31 in Figs. 1 and 4 separated from the plate by a horizontal slot 32 that extends through an arc of about 180°. This provides for a desired yieldability of the partly released portion for a purpose presently explained. The plate 24 is formed with an opening therethrough, as at 33 in Fig. 1 that is concentric with and of slightly greater diameter than the inside diameter of the collar. Fitted in the collar and projecting downwardly through the plate opening 33, is the lower end portion of an electric motor that is designated in its entirety by numeral 35. The motor 35 is fixedly secured in place by the tightening of a clamping bolt 36 that is extended rotatably through an ear 37 that is formed on the collar 30 at one side of the slot 31 and is threaded into an ear 38 at the other side of the slot. The tightening of the bolt contracts the split collar tightly about the motor case and holds it rigid in any position of longitudinal adjustment.

At the swinging end of the plate 24, a handle 40 is fixed thereto and to the collar 30, as has been shown in Figs. 1 and 4, and by means of this handle the plate 24 may be moved downwardly about the hinge axis to move the motor 35 accordingly. A spring comprising paired coils 41—41 is applied, under compression, about the hinge pin 21, with opposite end portions pressing against an end web 17x of carriage 17 and against a web 25x between the legs 25 in such manner as to lift and normally yieldingly hold the plate 24 and motor 35 in the upwardly inclined and raised position of Fig. 1.

To limit, or check the upward swing of the plate 24, a stop bolt 43 is threaded horizontally into a forward end leg of carriage 17, as well shown in Fig. 3, and this bolt has an inturned end portion 43' against which the end of plate 24, as carried on the paired legs 25 will engage when in that upwardly tilted position which will lift the router head, presently described, from the plywood panel on which the device is placed.

The drive shaft 35x of motor 35 extends downwardly therefrom and is equipped at its lower end with a pocket cutting or routing head 44, as shown in Fig. 4. The cutter head is so mounted on the shaft that when the motor is moved from raised position to the limit of its downward swing, as determined by the setting of the stop bolt 26, it will operate to cut a pocket to a predetermined depth in the panel on which the device is placed. The stop 26 may be set or adjusted for more or less depth.

In Fig. 4, the present router has been shown as disposed upon a panel of plywood, designated by reference numeral 45, and the cutter head 44 is so mounted as to cut a pocket to the exact depth of the uppermost ply of the panel. It is to be explained further that it is the intent, that routers or cutter heads 44 of various diameters be interchangeably applicable to the motor shaft 35x so that pockets of different widths can be formed. The specific details of the cutter head are immaterial.

Flow of electric current to motor 35 is controlled by a switch mechanism 48 located on the handle member 40 and adapted to be opened and closed by a trigger 49 that is pivoted in the handle and extended to a position which makes it easily operable by the index finger of the hand by which the operator grips the handle in the normal mode of operation. Current supply wires are designated at 50 in Fig. 1. These lead to the motor through the switch 48. It is to be understood that other types of motors might be used in lieu of the electric motor shown. For example, I may utilize an air driven motor which would be operated under control of a valve to be manipulated by the trigger 49.

The length of a pocket as formed by the cutter head is determined by the distance or extent of reciprocal travel of the carriage 17 and this travel is established by the use of stops against which downwardly directed legs, 18—18, at opposite ends of the carriage are adapted to abut. It is shown in Fig. 1, that a bolt 55 is adjustably mounted in the boss 14 at the forward end of the plate 10. This will limit the forward travel of the carriage. Also, it is shown in Figs. 1 and 2, that a wheel 56 is mounted for rotation on the rod 15 at that same side of the base plate, and mounted on this wheel, eccentric thereof as has been shown in Fig. 5, are stop bolts 57 and 58, these being of different lengths, and extend from the wheel toward the forward end of the device, parallel with the wheel mounting rod 15, and which, by rotation of the wheel can selectively be brought into position for engagement by the adjacent end of carriage 17 to limit its travel in that direction. The wheel is peripherally notched, as at 59 in Fig. 5; these notches being designed to seat the yieldable end portion of a spring latch 60, mounted on plate 10, thus to retain an adjustment of the wheel whereby either the stop 57, for one distance of travel of the carriage, or stop 58 for another distance can be employed. Assuming the router of Fig. 1 to be so constructed, it is used in the following manner: The device, as held by the two hands of the user grasping the knob 12 and handle 40, is placed flatly upon the plywood panel as in Fig. 4, with the teeth of the plate pressed into the panel and the defect of the panel to be removed centered in the opening 11 of base plate 10. Then the motor 35 as carried on plate 24 is then swung downwardly, by means of handle 40, and the cutter head 44 caused to cut into the panel. Then the motor, while held in this lowered position, is pushed or pulled to move it at least once through the full extent of its reciprocal travel as permitted by the selected stops. This causes the cutting out of the defect and the coincident formation of a patch pocket of a predetermined size. The downward holding pressure against the handle 40 is then removed and the spring 41 operates to lift the plate 24 and motor from position of Fig. 4 to the non-cutting position of Fig. 1.

In Fig. 4 a pocket is designated by numeral 45x and its overall length is designated by the length of the arrows R.

In Figs. 7 and 8, I have illustrated an alternative spring means that may be used for lifting the motor 35 to non-cutting position in lieu of coiled spring 41 as used in the device of Fig. 1. This comprises a spring plate 65 with an angularly formed flange 65' at its lower end whereby it is fixed by screws 67 to the top surface of the carriage 17. This plate is of U-shape, as seen in Fig. 8, and the two leg portions 65x thereof, bear upwardly against the plate 24, rearwardly of its pivot hinge pin mounting 21.

Figure 11:
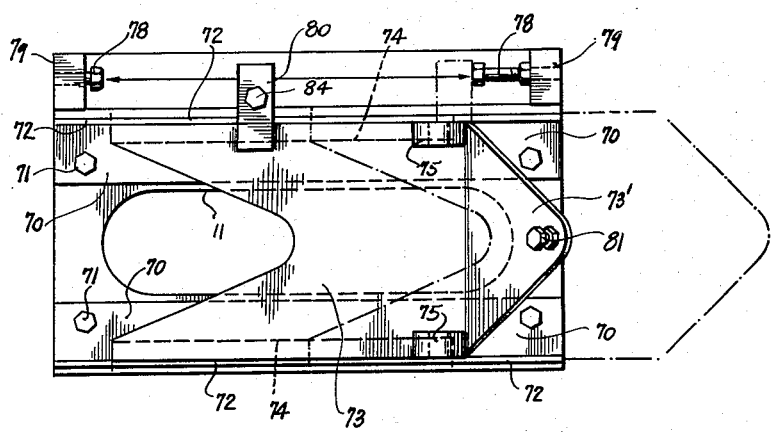
Fig. 11 is a plan view of the base frame, carriage and guides of the device of Fig. 9.

In Figs. 9, 10 and 11, I have illustrated an alternative form of motor carriage and an alternative means and manner of reciprocally mounting the carriage on the base plate 10.

In these particular views the base plate 10 is not equipped for nor does it mount the longitudinal guide rods 15—15, but in lieu thereof it is equipped along its opposite longitudinal edge portions with flat metal strips 70—70, secured at their ends to the base plate by bolts 71, and having their outer longitudinal edges turned upwardly and inwardly to provide guide flanges 72—72, as well shown in Fig. 10. Reciprocally mounted on these strips 70—70 is a carriage in the form of a flat plate 73, equipped along its side edges, at the underside, with runners 74—74 that project beneath the flanges 72—72 to secure and guide the carriage in its reciprocal movements. At its forward end the carriage is equipped with laterally spaced, upwardly directed bosses 75—75 which mount a hinge pin 76 therein on which a motor carrier plate 24 is mounted in the same manner of mounting the plate as shown in Fig. 1.

In this alternative form, as seen in Fig. 11, the carriage 73 is limited in its reciprocal travel in opposite directions by stop bolts 78—78, that respectively, are adjustably mounted in upstanding bosses 79—79 at opposite ends of the base plate 10 to be engaged by a lug 80 that is formed on the carriage and extends laterally therefrom to a position of alignment between the said adjustable stops.

The upward tilting of the plate 24, as used on this alternative form of carriage and when used to mount a motor as in Fig. 4, is stopped by the forward end of the plate 24 engaging against a stop bolt 81 that is adjustably mounted in an upwardly inclined forward end portion 73' of the carriage 73. A coiled spring 41x applied about the hinge pin 21 and engaged at its opposite ends with the carriage and web that is between the legs 25 of plate 24, urges the plate to its upwardly inclined or raised position and yieldingly retains it there, but permits it to be manually depressed for engaging the cutter head with the panel 45.

The downward swing of the plate 24 in the device of Figs. 9 and 10 is limited by the contacting of the plate 24 with an adjustable stop bolt 84 that is threaded into and extends upwardly from the boss 80, as formed on the carriage plate 73.

The router, when equipped with the carriage 73 and its guides 72—72 as in Figs. 9, 10 and 11, is used in exactly the same manner and for the same purposes as is the device of Figs. 1 to 4.

Figure 12:
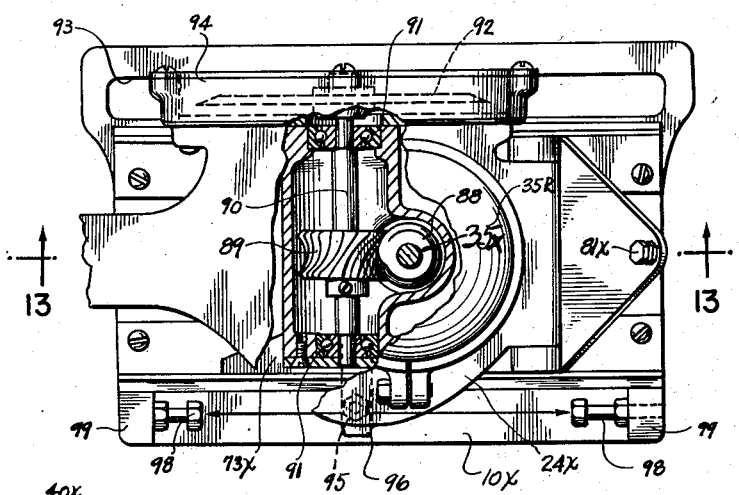
Fig. 12 is a plan view of a pocket cutter or router of an alternative form, certain parts being broken away for explanatory purposes.
Figure 13:
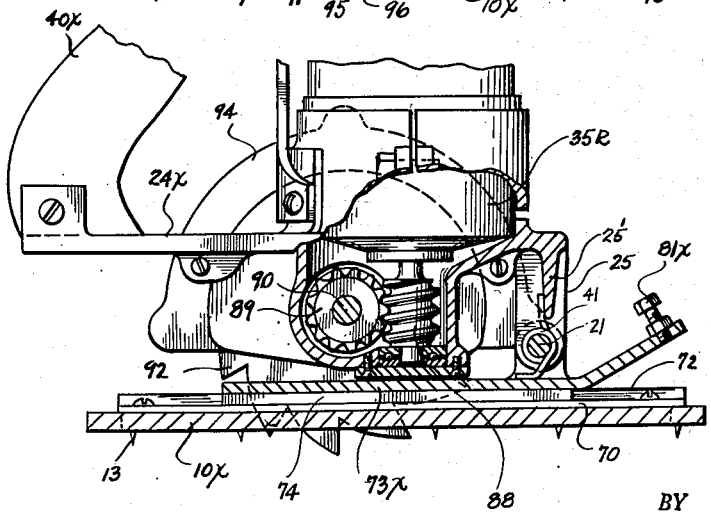
Fig. 13 is a longitudinal sectional detail, taken substantially on line 13—13 in Fig. 12.

The device which is shown in Figs. 12 and 13 is similar in its mode of use and also similar in many respects in construction to those of Figs. 1 and 9, but is equipped for saw forming a slot designed to receive a patch piece of like dimensions. In this modification, the device comprises a flat base plate 10x with flanged guides 72—72 fixed thereto as in the device of Figs. 9 and 10, and between which guides a flat carriage 73x is reciprocally mounted. This carriage hingedly mounts a motor supporting plate 24x thereon in the same manner and substantially by the same devices as in Fig. 9, and the plate 24x mounts an electric motor 35R thereon, as in Fig. 1. However, the motor shaft 35x is here equipped with a worm 88 that drives a worm wheel 89 fixed on a cross-shaft 90. This shaft is rotatably mounted in bearings 91—91, carried on the gear housing on the underside of plate 24x, and one end thereof extends to a side of the plate 24x and is there equipped with a disk type groove cutting saw 92.

The saw 92 operates through a longitudinal slot 93 formed along one side of the base plate 10x and a saw guard 94 is attached to the plate 24x as shown. The motor mounting plate 24x is here upwardly and downwardly tiltable as in the device of Fig. 4, and its upward tilting movement is limited by an adjustable stop 81x applied to the upwardly inclined forward end portion of plate 73x, and its downward travel is limited by an adjustable stop bolt 95 fixed in a lug 96 that extends laterally from carriage 73x.

This device of Figs. 12 and 13 is equipped with a handle 40x attached to the swinging end of plate 24x and to the motor 35R in the same manner as illustrated in Fig. 4. The reciprocal travel of the carriage in the device of Fig. 12 is limited by the engagement of the lug 96 with stop bolts 98—98 that are adjustably fixed in bosses 99—99 that project upwardly from opposite ends of plate 10x; these parts being shown in Fig. 12. The use of the device of Fig. 13 for cutting slots is carried out in the same manner as the device of Fig. 1 is used for the cutting of patch pockets.

Having thus described my invention, what I claim as new therein and desire to secure by Letters Patent is:

1. In a router of the character described, in combination, a horizontal base member adapted to be disposed upon a flat surface panel, paired guides fixed horizontally on the base plate, a carriage reciprocally mounted by the guides, a hinge pin mounted in the carriage transversely of the direction of its reciprocal travel, a motor mounting plate overlying the carriage and extended in its direction of reciprocal travel and having transversely spaced legs at one end thereof hingedly mounted at their lower ends on the said hinge pin thus providing for upward and downward swinging of the plate at its other end, a spring coil applied about the hinge pin and acting at its opposite ends against the carriage and plate to lift the latter from lowered to a raised position, a motor mounted on the plate with its drive shaft extended downwardly, a cutter head on the motor shaft, a handle fixed to the free end of the hinged plate for moving the plate downwardly to engage the cutter with the panel on which the router is disposed and for moving the carriage reciprocally, a control for the motor mounted in the handle.

2. A defect removing and pocket forming router comprising a base member adapted to be functionally disposed upon a flat surfaced panel, guides flatly disposed on the base member and, a carriage mounted on and flatly engaging the top surface of said base member between the guides for reciprocal movement thereon in a plane that is parallel with the supporting surface of said base member, a motor mounting plate overlying the carriage and hinged thereto and extended in the direction of reciprocal travel of the carriage for up and down swinging adjustment, a motor mounted on said plate, a motor driven shaft extended laterally of the plate, a cutter mounted on the said driven shaft and movable from and into cutting contact with a panel on which the router may be disposed by an upward and downward adjustment of the said motor mounting plate about its hinge axis, and a handle on the plate for reciprocal actuation of the carriage and swinging adjustment of the motor carrying plate on its hinge mounting.

References Cited in the file of this patent

UNITED STATES PATENTS

| | | |
|---|---|---|
| 1,638,086 | Carter | Aug. 9, 1927 |
| 1,745,780 | Casey | Feb. 4, 1930 |
| 1,899,883 | Sacrey | Feb. 28, 1933 |
| 2,591,002 | Pedron | Apr. 1, 1952 |
| 2,630,151 | Turnbull | Mar. 3, 1953 |